UNITED STATES PATENT OFFICE.

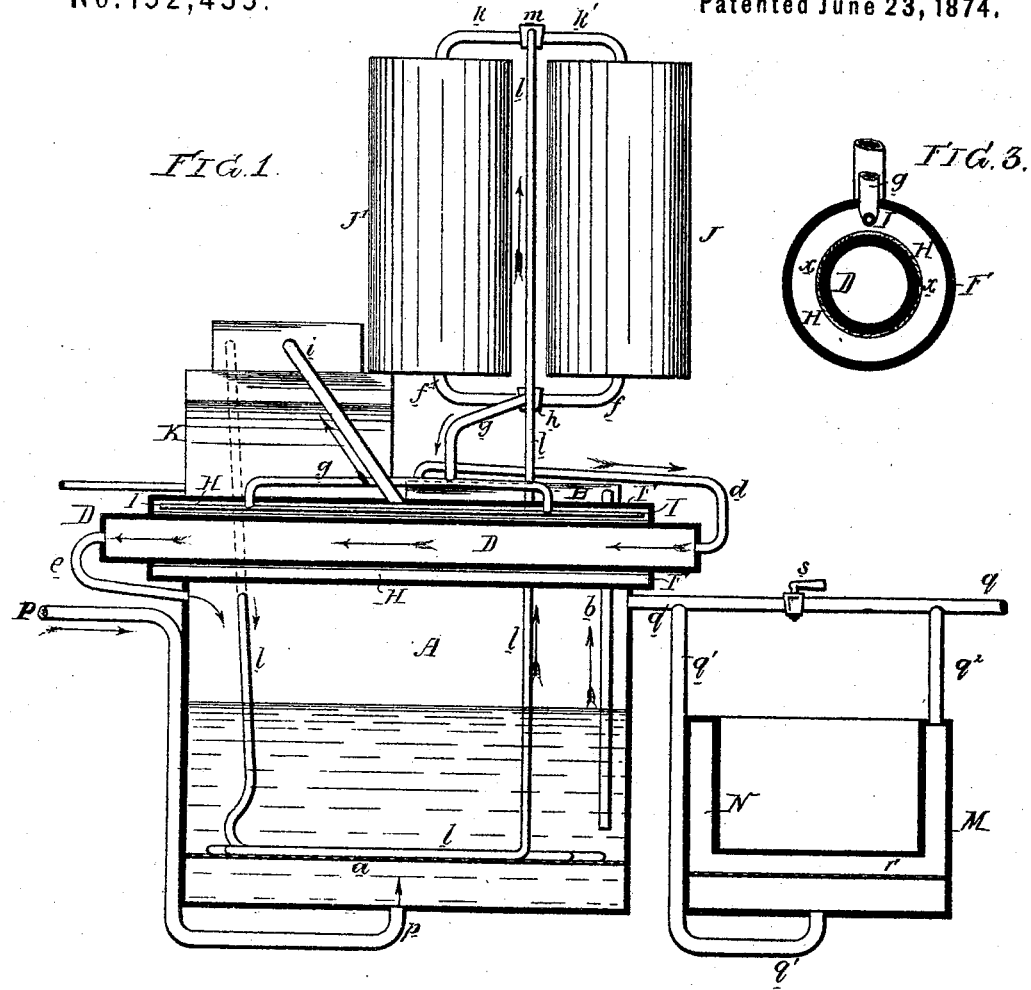
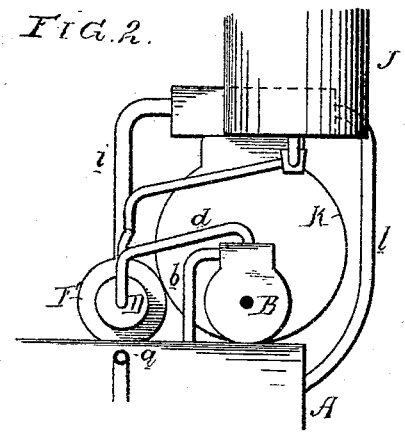
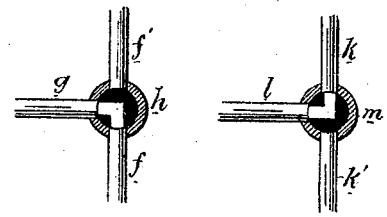

B. FRANK TEAL, OF PHILADELPHIA, PENNSYLVANIA.

IMPROVEMENT IN ICE-MACHINES.

Specification forming part of Letters Patent No. 152,435, dated June 23, 1874; application filed March 26, 1874.

*To all whom it may concern:*

Be it known that I, B. FRANK TEAL, of Philadelphia, Pennsylvania, have invented certain Improvements in Ice-Machines, and refrigerating apparatus, of which the following is a specification:

My invention relates to that class of ice-machines and refrigerating apparatus in which the required low temperature is produced by the rapid evaporation of bisulphide of carbon or other highly volatile liquid; and the object of my invention is obtain the most direct and otherwise best result from evaporation of the liquid by the apparatus, which I will now proceed to describe, reference being had to the accompanying drawing, in which—

Figure 1 is a sectional elevation of the apparatus. Fig. 2, an end elevation; and Figs. 3, 4, and 5 detached sectional views drawn to an enlarged scale.

The base of the apparatus consists of a large tank or vessel, A, preferably constructed of boiler-iron, and having a perforated false bottom, $a$, and an inlet (not shown in the drawing) through which the vessel may be filled or partially filled with a saturated solution of salt and water. The latter is drawn from the tank through a pipe, $b$, into a pump, B, and is forced by the latter through a pipe, $d$, into and through a vessel, D, and from the latter through a pipe, $e$, back into the tank, a continuous circulation being thus maintained as long as the pump remains in operation, for a purpose which will be rendered apparent hereafter. The vessel D extends through a casing, F, and is covered within the latter with a jacket, $x$, of cloth or other porous or absorbent material, as shown in Fig. 3; and immediately above the said vessel B, and within the annular chamber H, formed between the same and the outer casing F, is a distributing-pipe, I, perforated on its under side with a number of small holes. This distributer I is supplied with liquid bisulphide of carbon from either of two reservoirs, J or J', arranged side by side and communicating with the said distributer through pipes $f\ f'$ and $g$, a three-way cock, $h$, determining which of the said reservoirs shall furnish the supply. (See Figs. 1 and 4.) A pump, K, exhausts the bisulphide of carbon from the chamber H through a pipe, $i$, and forces the same back into the reservoirs J J' through a pipe, $l$, which passes through and is coiled within the tank A. This pipe $l$ communicates with two pipes, K and K', leading to the reservoirs, and a three-way cock, $m$, arranged at the junction of the said pipes, as shown in Figs. 1 and 5, and permits the pipe $l$ to be put into communication with either reservoir.

I propose to operate the three-way cocks $m$ and $h$ by a single connecting-rod, so that they can be adjusted simultaneously in such manner as to cause the reservoir J to discharge its contents through the pipe $g$ simultaneously with the filling of the opposite reservoir J' by the pipe L, and vice versa. A pipe, $p$, through which air can be forced under pressure, communicates with the bottom of the tank A, and at the top of the latter there is an outlet-pipe, $q$, a branch, $q'$, of which communicates with the bottom of a vessel, M, having a perforated partition, $r$, and containing salt-water, another branch, $q^2$, of the outlet-pipe communicating with the top of the vessel, and the said outlet-pipe being furnished with a cock, $s$, between its branches for a purpose explained hereafter. The vessel M has a central chamber, N, for the reception of the water which is to be converted into ice, or the water may be contained in separate boxes or pans suspended from the top of and extending into the said vessel M.

The operation of the apparatus is as follows: The pumps B and K are started, the three-way cocks $m$ and $h$ are so adjusted that the bisulphide of carbon or other volatile liquid shall be drawn from one reservoir and forced back into the other, and air is forced by a blower or pump through the pipe $p$ and into and through the tank A. The volatile liquid passes from one of the reservoirs—that marked J, for instance—into the distributer I, and through the perforations of the latter into the jacket $x$, by which it is in turn distributed over the entire exterior surface of the vessel D, and as a nearly perfect vacuum is maintained in the chamber H by the pump K, the result must be a rapid evaporation of the volatile liquid from the surface of the vessel D, and a consequent absorption of caloric from the liquid contents of the latter. As this evaporating process is continued uninterruptedly, and as the salt-water is caused to circulate continuously through the vessel D and tank A, the said salt-water must be reduced to and maintained at a very low temperature.

The bisulphide of carbon, or other equivalent liquid, which has been withdrawn from the reservoir J and volatilized, is forced by the pump K through the pipe L, and is condensed in the coiled portion of the latter, partly by the pressure and partly by the contact of the cold salt-water with the exterior of the said coil, so that when discharged into the reservoir J' it will have again assumed a liquid form, and will be ready for use a second time, when it becomes necessary, in consequence of the exhausting of the supply from the reservoir J, to again adjust the three-way cocks so as to draw the supply from the reservoir J', and force the condensed liquid back into the reservoir J.

Water to be converted into ice might be placed in boxes or pans, to be lowered into the tank A, and brought in direct contact with the cold salt-water therein; but I prefer to use the supplemental freezing-vessel M. The air, when forced into the bottom of the tank A, passes through the perforations of the false bottom $a$, and is thus divided into a number of fine jets, which, in bubbling up through the cold salt-water, are reduced to a very low temperature, and the air thus cooled passes off through the pipe $q$, thence through the branch $q'$ into the vessel M, and upward through the perforated partition $r$ and salt-water in the said vessel, which is thus reduced to a sufficiently low temperature to freeze the water in the pan N. The air passes finally through the branch $q^2$ into the pipe $q$, whence it may be conducted off to a refrigerating apparatus, or be utilized in the cooling of rooms or apartments. If the air is to be used for this latter purpose only, the cock $s$ is so turned that it may pass directly through the pipe $q$ without entering the vessel M.

I propose, in hot summer weather especially, to draw the supply of air for the pipe $p$ from the room or apartment with which the pipe $q$ communicates, so that when the apparatus has been in operation for a time the air which is forced into the tank A may be in a comparatively cool condition.

One of the most important features of my invention is the evaporation of the volatile liquid on the surface of a water-vessel, D.

In carrying out this feature, it is not absolutely necessary that a perforated distributer, I, shall be used, as I have found it advisable, in some instances, to employ a pipe with a number of cocks. Neither is it absolutely essential that the exterior of the vessel D should be jacketed, although I prefer this plan, inasmuch as it insures a thorough distribution of the volatile liquid over the surface of the said vessel.

I propose, in some instances, to so modify the apparatus that the water to be frozen can be placed in the vessel D, on the surface of which the volatile liquid is evaporated.

I claim as my invention—

1. An ice-machine or refrigerating apparatus, in which the water to be cooled is contained within or passed continuously through a vessel, D, while a volatile fluid is distributed in a thin layer over the outer surface of the said vessel, and is evaporated therefrom, as set forth.

2. The combination, substantially as described, of the two reservoirs J and J', the evaporating-chamber H, the pump K, the condensing-coil in the tank A, and pipes and cocks, whereby the volatile liquid may be conveyed from one reservoir to the evaporating-chamber and pump, and from the latter to the condenser, and back into the other reservoir, all substantially as specified.

3. The combination, substantially as described, of the adjoining reservoirs J and J', their pipes $f f'$, $g$, $k k'$, and $l$, and the connected three-way cocks $h$ and $m$.

4. The vessel M, its water-receptacle and grating $r$, and the pipes $q^1$ $q^2$, communicating with the said vessel, one below and the other above the level of the water in the same, all substantially as specified.

In testimony whereof I have signed my name to this specification in the presence of two subscribing witnesses.

B. FRANK TEAL.

Witnesses:
WM. A. STEEL,
HARRY SMITH.